(12) United States Patent
Schmidt et al.

(10) Patent No.: US 11,300,132 B2
(45) Date of Patent: Apr. 12, 2022

(54) FAN ARRANGEMENT WITH FAN AND TOOTHED RING, AND CONVERTER MOTOR WITH FAN ARRANGEMENT

(71) Applicant: SEW-EURODRIVE GMBH & CO. KG, Bruchsal (DE)

(72) Inventors: Josef Schmidt, Graben-Neudorf (DE); Firat Altan, Karlsruhe (DE); Thomas Zöller, Bruchsal (DE); Jens Schäfer, Graben-Neudorf (DE); Christian Schumann, Leimersheim (DE); Matthias Hauck, Schwetzingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 394 days.

(21) Appl. No.: 16/485,353

(22) PCT Filed: Feb. 1, 2018

(86) PCT No.: PCT/EP2018/025027
§ 371 (c)(1),
(2) Date: Aug. 12, 2019

(87) PCT Pub. No.: WO2018/145818
PCT Pub. Date: Aug. 16, 2018

(65) Prior Publication Data
US 2019/0379256 A1     Dec. 12, 2019

(30) Foreign Application Priority Data
Feb. 10, 2017   (DE) .................... 10 2017 001 264.4

(51) Int. Cl.
*F04D 27/00*   (2006.01)
*F04D 29/28*   (2006.01)
*F04D 25/08*   (2006.01)

(52) U.S. Cl.
CPC .......... *F04D 27/001* (2013.01); *F04D 25/08* (2013.01); *F04D 29/281* (2013.01)

(58) Field of Classification Search
CPC ...... F04D 27/001; F04D 29/281; F04D 25/08; F04D 29/28; F04D 29/282; F04D 17/00;
(Continued)

(56) References Cited

U.S. PATENT DOCUMENTS 6,386,839 B1 * 5/2002 Chuang ................... F01D 5/045
                                                          415/199.6
9,631,639 B1 * 4/2017 Shinsato ................. F24F 13/24
(Continued)

FOREIGN PATENT DOCUMENTS

CN        86108207 A    10/1987
CN       202851447 U     4/2013
(Continued)

OTHER PUBLICATIONS

International Preliminary Report on Patentability issued from the International Bureau dated Aug. 22, 2019.
(Continued)

*Primary Examiner* — Bryan M Lettman
(74) *Attorney, Agent, or Firm* — Carter, DeLuca & Farrell LLP

(57) ABSTRACT

A fan arrangement includes a fan and toothed ring, and a converter motor includes a fan arrangement. The fan includes a base body on which fan blades are premolded, and the fan includes an annular region, which is premolded on the side of the fan blades facing away from the base body. The toothed ring is situated within the annular region, and thus, in particular, is set apart from the base body, and thus, in particular, is set apart from the base body via the fan blades.

26 Claims, 3 Drawing Sheets

(58) Field of Classification Search
CPC ...... F04D 17/08; F04D 17/16; F04D 15/0066; F04D 15/0077; F04D 15/0088; F04D 15/0094; F04D 29/283; F04D 29/325; F04D 29/326; F04D 29/329; F04B 49/20; F04B 49/103; F04B 49/065; F04B 49/06; F04B 2201/1201; F04B 2203/0209; F04C 14/08; F04C 14/28; F04C 28/08; F04C 28/28; F04C 2270/05; F04C 2270/051; F04C 2270/86; H02K 11/21; H02K 11/215; H02K 9/06
See application file for complete search history.

(56) References Cited

U.S. PATENT DOCUMENTS

| | | | |
|---|---|---|---|
| 9,790,961 B2 | 10/2017 | Wu et al. | |
| 2008/0101966 A1 | 5/2008 | Lopatinskey et al. | |
| 2009/0027853 A1* | 1/2009 | Simofi-Ilyes | H02K 1/278 |
| | | | 361/695 |
| 2014/0199155 A1* | 7/2014 | Malone | F01D 21/04 |
| | | | 415/1 |
| 2015/0176594 A1* | 6/2015 | Gebert | F04D 29/681 |
| | | | 416/186 R |
| 2017/0175749 A1* | 6/2017 | Svarre | F04D 29/053 |

FOREIGN PATENT DOCUMENTS

| | | |
|---|---|---|
| CN | 104976159 A | 10/2015 |
| CN | 105020175 A | 11/2015 |
| CN | 105756987 A | 7/2016 |
| DE | 20309188 U1 | 8/2003 |
| DE | 102007044176 A1 | 3/2009 |
| JP | S 62237097 A | 10/1987 |
| JP | 2014190309 A | 10/2014 |

OTHER PUBLICATIONS

International Search Report dated Apr. 23, 2018, in International Application No. PCT/EP2018/025027 (English-language translation).

* cited by examiner

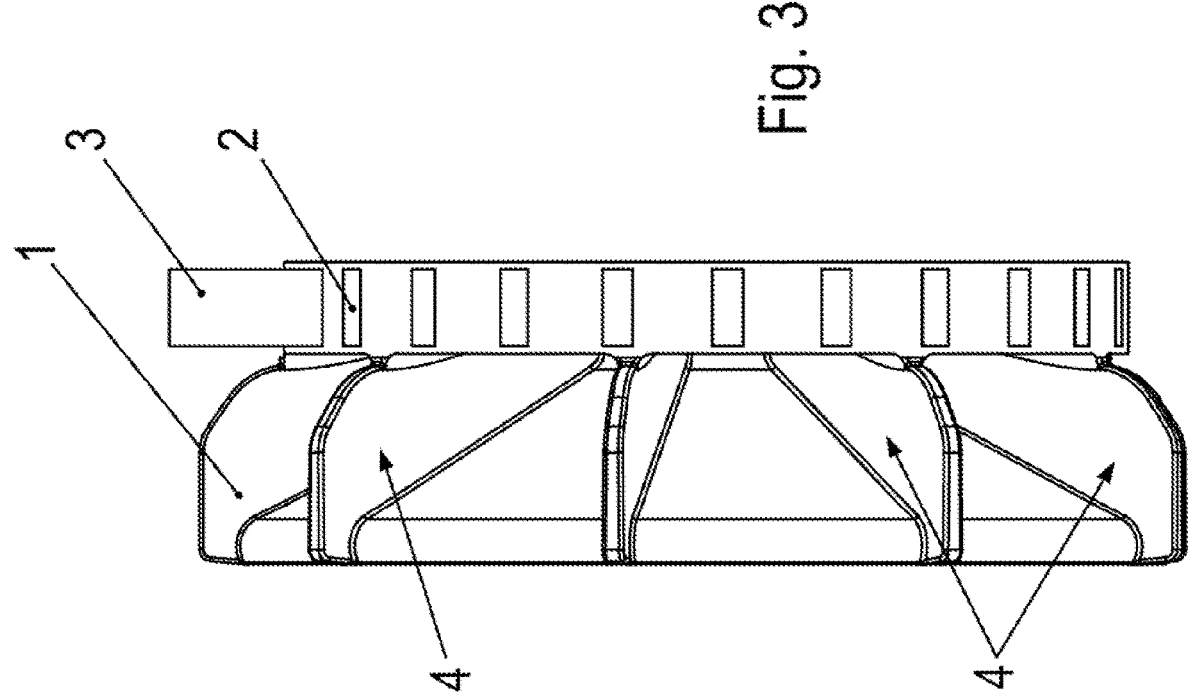

FAN ARRANGEMENT WITH FAN AND TOOTHED RING, AND CONVERTER MOTOR WITH FAN ARRANGEMENT

FIELD OF THE INVENTION

The present invention relates to a fan arrangement with a fan and toothed ring, and to a converter motor with a fan arrangement.

BACKGROUND INFORMATION

Certain conventional fans can be connected to a shaft in a torsion-resistant manner.

SUMMARY

Example embodiments of the present invention provide a fan arrangement in which a compact configuration of a motor which includes the fan arrangement may be obtained.

According to example embodiments of the present invention in a device and in a method, the fan arrangement is provided with a fan and toothed ring, and the fan has a base body on which fan blades are premolded. The fan includes an annular region which is premolded on the side of the fan blades facing away from the base body, and the toothed ring is situated within the annular region, in particular, is set apart from the base body, and in particular, is set apart from the base body via the fan blades.

This offers the advantage that a motor may have a compact configuration because a metallic toothed ring is able to be provided on the fan in the plastic material of the fan. As a result, the fan has two functions, i.e. the function of conveying an airflow, and the function of a transducer for a sensor for acquiring the angular position. A very compact configuration of the fan is achievable by extrusion-coating the toothed ring. In addition, the annular region of the fan is suitable for accommodating the toothed ring and, at the same time, for routing the airflow conveyed by the fan.

The sensor together with the associated evaluation electronics may be provided on a circuit board, which is pressed toward a fan cover that radially surrounds the fan. Via the fan cover, heat from the components situated on the circuit board is therefore also able to be dissipated to the airflow conveyed by the fan. The fan cover may be produced from a metallic material.

Thus, the motor is able to be given a very compact overall configuration.

According to example embodiments, the radially outer end regions of the toothed ring—in particular viewed from the axis of rotation of the fan—are not surrounded by material of the fan, the toothed ring in particular being integrally accommodated in the fan, in particular, the remaining region of the toothed ring, i.e. especially the entire toothed ring except for the radially outer end regions, is surrounded by the material of the fan. This is considered advantageous insofar as it allows for a better detection when acquiring the angular position. This is so because no material of the fan is interposed between the flow-routing elements of the sensor and the toothed ring, which therefore allows for an acquisition that is low in errors.

According to example embodiments, the fan blades extend in the axial and in the radial direction, in particular in relation to the axis of rotation of the fan, and/or the wall thickness of the respective fan blade, and in particular each fan blade, is constant when measured in the circumferential direction or in the respective tangential direction, in particular, the tangential direction being aligned parallel to the tangential direction extending through the center of gravity of the respective fan blade. This is considered advantageous insofar as the fan blades have a narrow configuration, and the conveyed airflow is able to be guided in respective channels that are restricted by the fan blades.

According to example embodiments, radially outward projecting teeth are formed on the toothed ring. Depending on the number of teeth, this has the advantage that a correspondingly high resolution is achievable.

According to example embodiments, the toothed ring is produced from ferrite or some other ferromagnetic material, in particular steel. This is considered advantageous because it allows for a simple and cost-effective production.

According to example embodiments, the base body includes a rotating body. This is considered advantageous insofar as it allows for a simple production.

According to example embodiments, the base body has a conical region, which transitions in the radially inward direction to a hollow-cylindrical region of the base body. This offers the advantage that the hollow-cylindrical region is provided for the nonpositive connection to a shaft and the conical region is suitably arranged for routing the air.

According to example embodiments, the airflow conveyed by the fan flows between two most proximate fan blades between the annular region and the base body in each case. This is considered advantageous insofar as it allows for an effective air routing.

According to example embodiments, the axial region covered by the annular region is encompassed by the axial region covered by the fan blades. This offers the advantage that the annular region is premolded on the fan blades and the air routing allows for a partial air deflection around the annular region.

According to example embodiments, the axial region covered by the annular region is encompassed by the axial region covered by the base body. This has the advantage that the hollow-cylindrical region of the base body axially overlaps with the annular region, which therefore makes it possible to route the air between the annular region and the base body.

According to example embodiments, the radial clearance region covered by the annular region is situated within the radial clearance region covered by the fan blades. This is considered advantageous insofar as an airflow is partially able to be routed around the annular region.

According to example embodiments, the annular region smoothly transition to the respective fan blade, in particular each fan blade, in particular in rounded form. This has the advantage that improved laminar air routing possible is able to be obtained.

According to example embodiments, the fan, i.e. in particular the base body, the fan blades and the annular region, is arranged as a plastic injection-molded part. This has the advantage that a simple production of the fan together with the toothed ring in the fan is possible, the toothed ring being extrusion-coated except for its radial end regions, in particular its teeth.

According to an example embodiment of the present invention, in a converter motor with a fan arrangement, the fan is connected in a torsion-resistant manner to a rotor shaft of the electric motor of the converter motor, and a sensor for detecting the toothed ring, in particular the teeth of the toothed ring which radially project in the outward direction, is connected to the stator housing of the electric motor in a reversible manner, in particular a torsion-resistant manner.

This has the advantage that the converter motor may have a compact configuration because the fan is used for conveying the airflow on the one hand, and as a transducer for a sensor on the other hand. The transducer part, i.e. the metallic and/or ferromagnetic toothed ring, is integrated into the fan.

Further features and aspects of example embodiments of the present invention are described in greater detail below with reference to the appended Figures.

BRIEF DESCRIPTION OF THE DRAWINGS

FIG. 3 is a side view of the fan arrangement.

DETAILED DESCRIPTION

Figure 1:
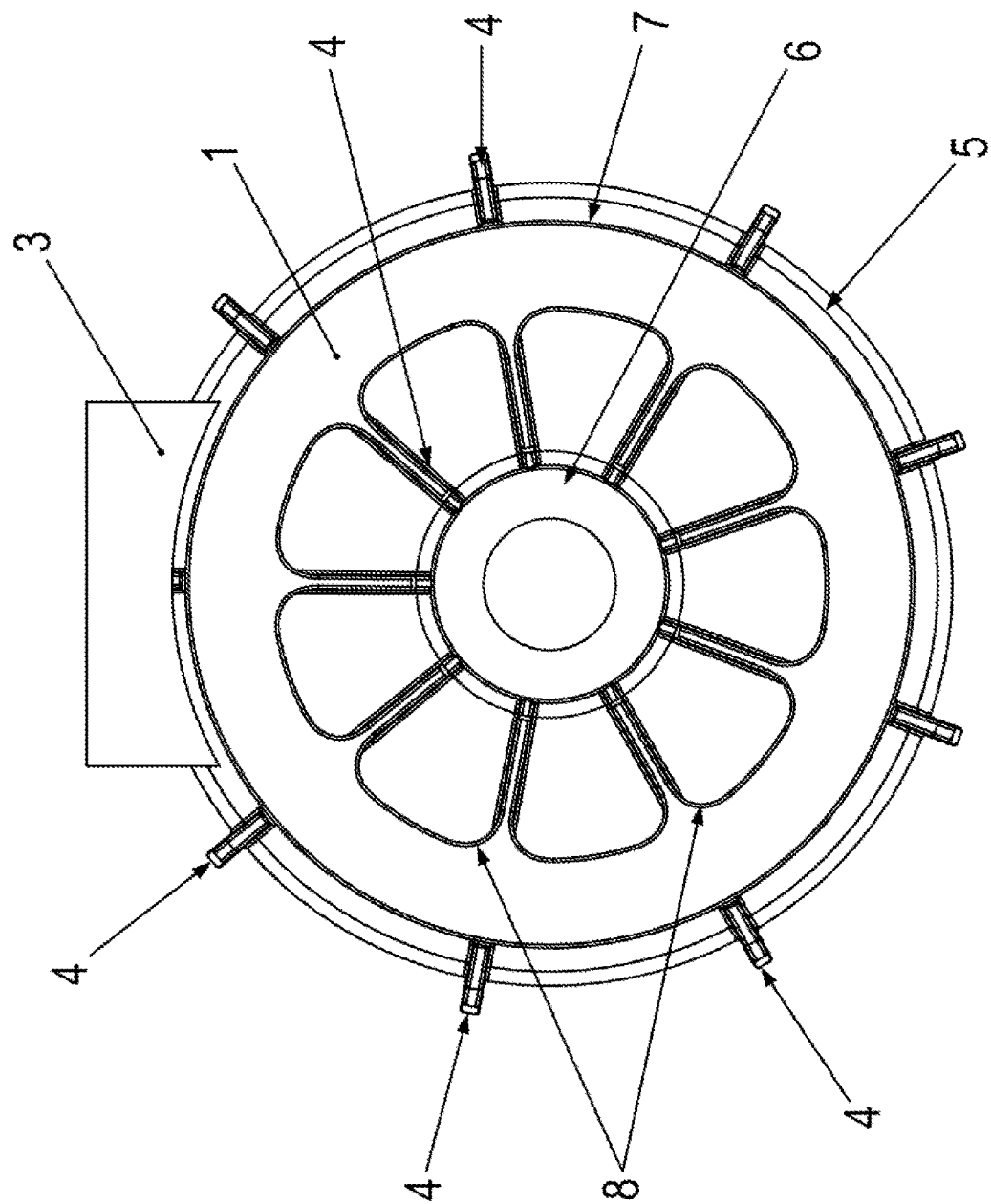
FIG. 1 is a plan view of a fan arrangement according to an example embodiment of the present invention.

In FIG. 1, a plan view of a fan arrangement according to an example embodiment of the present invention is illustrated, which has a fan 1 that includes an integrated toothed ring 2 and a sensor 3.

Figure 2:
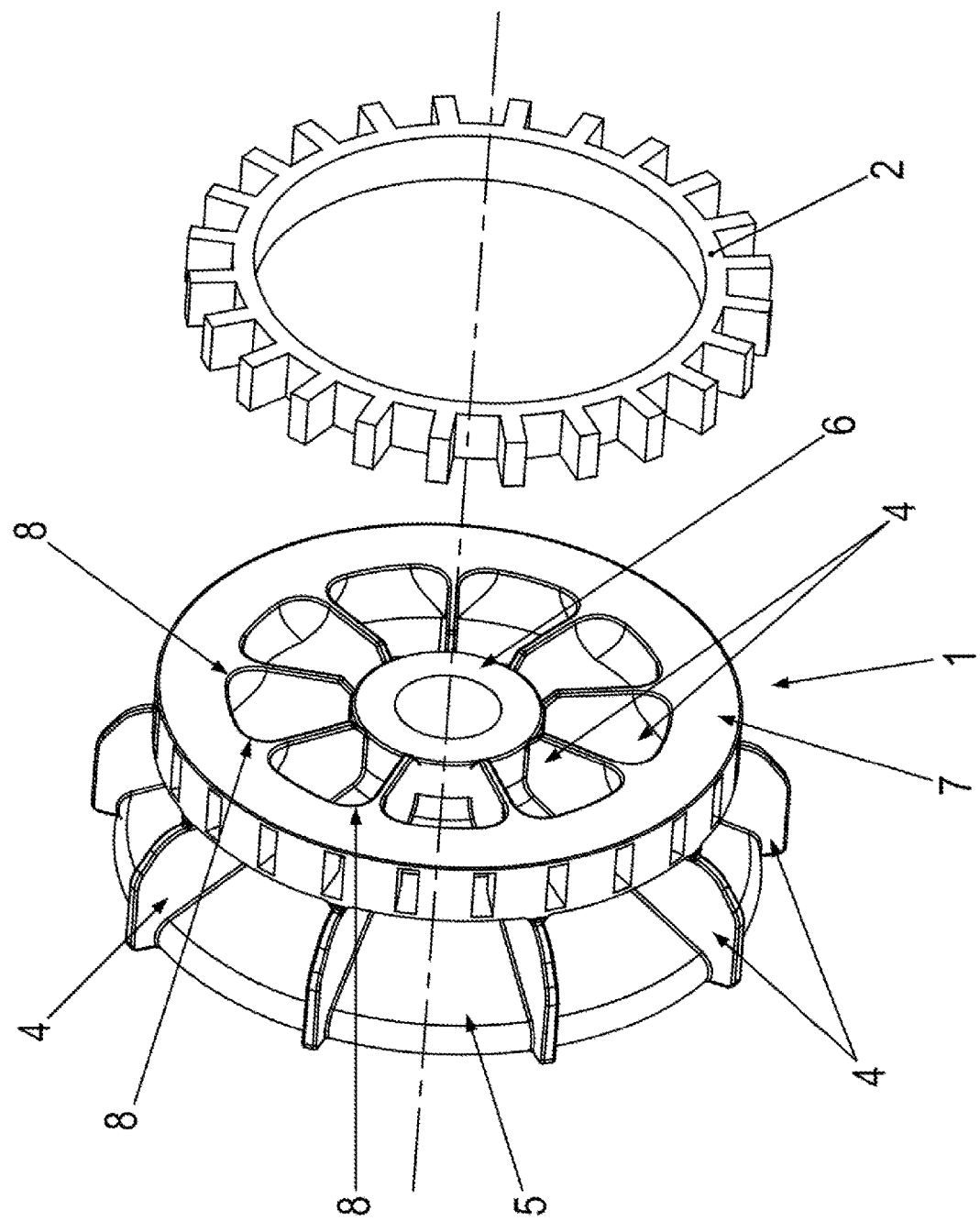
FIG. 2 is an exploded view of the fan arrangement.

In FIG. 2, a perspective view of the fan is illustrated, the toothed ring being illustrated separately.

In FIG. 3, a side view of the fan arrangement is illustrated.

As illustrated in the Figures, the fan arrangement has a fan 1 on which fan blades 4 are premolded.

Fan 1 is able to be connected in a torsion-resistant manner to a shaft. It is placed on top of the shaft in a centered manner.

Fan 1 also has a base body including a conical region 5 and a hollow-cylindrical region 6, which is provided with a centrically positioned round hole for the introduction of the shaft. The base body is a rotational body. In other words, it has a conical shape radially outside a first radial clearance and is hollow-cylindrical radially inside the first radial clearance value. The transition from conical form 5 to hollow-cylindrical form 6 has a rounded configuration so that this rounded region it situated in the region of the of the first radial clearance.

Fan blades 4 are premolded on base body 5.

In the circumferential direction with respect to the axis of rotation, i.e. the shaft axis, fan blades 4 are set apart from one another at regular intervals. Fan blades 4 have a leaf-shaped, in particular planar, configuration and thus extend in the radial and axial direction. The wall thickness measured in the circumferential direction is constant.

On the side of the fan blades situated across from the base body, an annular region 7 is provided on the fan, in which toothed ring 2 is situated. Although the material of the fan covers the toothed ring 2, it does not cover the radial end regions of the radially outward directed teeth of toothed ring 2. As a result, the distance from the stationary flow-routing elements of sensor 3 is as small as possible.

The radial clearance region covered by annular region 7 is encompassed by the radial clearance region covered by fan blades 4.

The axial region covered by annular region 7 is encompassed by the axial region covered by fan blades 4.

Annular region 7 is provided without circumferential interruptions in the circumferential direction.

The radial clearance region covered by annular region 7 extends from a second radial clearance to a third radial clearance, and the third radial clearance is greater than the second radial clearance, which is greater than the first radial clearance.

As a result, a space region for the airflow conveyed by the fan is provided between two most proximate fan blades 4 in the circumferential direction in each case, the airflow entering in the axial direction in the radial clearance region between the first and the second radial clearance and exiting in the radial direction radially outside the third radial clearance. The airflow conveyed by the fan thus axially passes through between annular region 7 and base body 5.

The transition region from fan blades 4 to annular region 7 is arranged in rounded form in each case. In FIG. 1 and FIG. 2, reference numeral 8 is used for this rounded region. Rounded region 8 extends in the axial direction across the entire axial width of annular region 7. Such a rounded transition region is provided starting at fan blade 4 in the circumferential direction, and a further transition region rounded in this manner is provided starting at the fan blade counter to the circumferential direction.

The curvature radius at an axial position h is denoted by $r(h)$. Curvature radius $r(h)$ monotonically decreases, in particular strictly monotonically, as the distance, in particular the axial distance, to the base body decreases. In other words, the curvature radii $r(h)$ decrease more and more in the respective axial plane toward the base body until the curvature radius $r(h)$ becomes zero, and thus reaches the axially lowest value of annular region 7.

The decrease in the curvature radius $r(h)$ until it vanishes may be a linear function of the axial position. As a result, an uncomplicated production is possible, and a laminar flow of the conveyed airflow is able to be induced.

The center point of respective curvature radius $r(h)$ of a first rounded region allocated to respective fan blade 4 has a radial clearance value that increases monotonically, in particular strictly monotonically, with the axial position, in particular with the axial distance from the base body, and/or an increasing circumferential angle value.

The center point of the particular curvature radius $r(h)$ of the other rounded region allocated to respective fan blade 4 has a radial clearance value that increases monotonically, in particular strictly monotonically, with the axial position, in particular with the axial distance from the base body, and/or a decreasing circumferential angle value.

The mentioned dependency of the respective radial clearance value and the amount of the circumferential angle value may be a linear function of the axial position. This allows for an uncomplicated production and makes it possible to induce a laminar flow of the conveyed airflow. The linear function is selected such that when the curvature radius $r(h)$ vanishes, the associated center point touches the annular region.

In further exemplary embodiments, a polynomial dependency, in particular with a polynomial of the second degree, on the axial position is also advantageous in order to induce an even further improved laminar airflow. This applies both to the radial clearance and/or to the amount of the circumferential angle value of the center point and also the curvature radius $r(h)$.

Fan 1 is able to be produced as a cast component, in particular from plastic, in particular using an injection molding method. Prior to the casting process, metallic toothed ring 2 is inserted into the casting mold and toothed ring 2 is thus surrounded by material, in particular plastic, of the fan. Toothed ring 2 remains uncovered only at the radially outer edge region so that no material of the fan is present between the sensor including its flow-routing element and these outer edge regions. This makes it possible to achieve a very narrow airgap between toothed ring 2 and the flow-routing element of sensor 3.

LIST OF REFERENCE NUMERALS 1 fan
2 toothed ring
3 sensor with flow-routing elements
4 fan blade
5 base body including conical and hollow-cylindrical region
6 hollow-cylindrical region
7 annular region
8 rounded region

The invention claimed is:

1. A fan arrangement, comprising:
   a fan; and
   a toothed ring;
   wherein the fan includes a base body, fan blades being premolded on the base body, the fan including an annular region that is premolded on a side of the fan blades facing away from the base body;
   wherein the toothed ring is arranged within the annular region;
   wherein radially outer end regions of the toothed ring are not surrounded by the material of the fan and/or the toothed ring is arranged as an integrated part of the fan; and
   wherein the entire toothed ring except for the radially outer end regions is surrounded by the material of the fan.

2. The fan arrangement according to claim 1, wherein the toothed ring is set apart from the base body.

3. The fan arrangement according to claim 1, wherein the toothed ring is set apart from the base body via the fan blades.

4. A fan arrangement, comprising:
   a fan; and
   a toothed ring;
   wherein the fan includes a base body, fan blades being premolded on the base body, the fan including an annular region that is premolded on a side of the fan blades facing away from the base body;
   wherein the toothed ring is arranged within the annular region; and
   wherein airflow conveyed by the fan passes through between two most proximate fan blades between the annular region and the base body.

5. The fan arrangement according to claim 1, wherein the fan blades extend in axial and radial directions.

6. The fan arrangement according to claim 1, wherein a wall thickness of at least one of the fan blades is constant in a circumferential direction and/or in a tangential direction.

7. The fan arrangement according to claim 6, wherein the tangential direction is aligned parallel to a tangential direction extending through a center point of the respective fan blade.

8. The fan arrangement according to claim 6, wherein the wall thickness of each fan blade is constant in the circumferential direction and/or in the tangential direction.

9. The fan arrangement according to claim 1, wherein the toothed ring includes teeth that project radially outwardly.

10. The fan arrangement according to claim 1, wherein the toothed ring is formed of ferrite, a ferromagnetic material, and/or steel.

11. The fan arrangement according to claim 1, wherein the base body includes a rotational body.

12. The fan arrangement according to claim 1, wherein the base body includes a conical region that transitions to a hollow-cylindrical region of the base body in a radially inward direction.

13. The fan arrangement according to claim 1, wherein an axial region covered by the annular region is encompassed by an axial region covered by the fan blades.

14. The fan arrangement according to claim 1, wherein an axial region covered by the toothed ring is encompassed by an axial region covered by the fan blades.

15. The fan arrangement according to claim 1, wherein an axial region covered by the annular region is encompassed by an axial region covered by the base body.

16. The fan arrangement according to claim 1, wherein a radial clearance region covered by the annular region is arranged within a radial clearance region covered by the fan blades.

17. The fan arrangement according to claim 1, wherein the annular region smoothly transitions to at least one of the fan blades and/or each of the fan blades.

18. The fan arrangement according to claim 1, wherein the annular region smoothly transitions to at least one of the fan blades and/or each of the fan blades in a rounded manner.

19. The fan arrangement according to claim 1, wherein the fan, the base body, the fan blades, and/or the annular region include a plastic injection-molded part.

20. The fan arrangement according to claim 1, wherein the fan has a rounded region as a transition between the fan blades and the annular region, the rounded region having a curvature radius that decreases monotonically, strictly monotonically, in a linear fashion, and/or according to a polynomial function in an axial plane in an axial direction, with increasing distance from the base body.

21. A converter motor, comprising:
   a fan arrangement as recited in claim 1;
   an electric motor including a rotor shaft, the fan being connected to the rotor shaft in a torsion-resistant manner; and
   a sensor adapted to detect an angular position of the toothed ring releasably connected to a stator housing of the electric motor.

22. The converter motor according to claim 21, wherein the sensor is adapted to detect the teeth of the toothed ring, and wherein the sensor is connected to the stator housing of the electric motor in a torsion-resistant manner.

23. A fan arrangement, comprising:
   a fan; and
   a toothed ring;
   wherein the fan includes a base body, fan blades being premolded on the base body, the fan including an annular region that is premolded on a side of the fan blades facing away from the base body;
   wherein the toothed ring is arranged within the annular region; and
   wherein the toothed ring and the teeth are surrounded by material of the annular region, only radial outer surfaces of the teeth being not covered by the material of the annular region.

24. A converter motor, comprising:
   a fan arrangement as recited in claim 23;
   an electric motor including a rotor shaft, the fan being connected to the rotor shaft in a torsion-resistant manner; and
   a sensor adapted to detect an angular position of the toothed ring releasably connected to a stator housing of the electric motor.

25. The fan arrangement according to claim 4, wherein radially outer end regions of the toothed ring are not surrounded by the material of the fan and/or the toothed ring is arranged as an integrated part of the fan.

26. A converter motor, comprising:
a fan arrangement as recited in claim 4;
an electric motor including a rotor shaft, the fan being connected to the rotor shaft in a torsion-resistant manner; and
a sensor adapted to detect an angular position of the toothed ring releasably connected to a stator housing of the electric motor.

\* \* \* \* \*